US00RE47328E

(19) United States
(12) Reissued Patent
Yuk et al.

(10) Patent Number: US RE47,328 E
(45) Date of Reissued Patent: Mar. 26, 2019

(54) METHOD FOR TRANSMITTING AND RECEIVING SYSTEM INFORMATION ELEMENTS IN A WIRELESS ACCESS SYSTEM

(71) Applicant: LG ELECTRONICS INC., Seoul (KR)

(72) Inventors: Young Soo Yuk, Anyang-si (KR); Jeong Ki Kim, Anyang-si (KR); Ki Seon Ryu, Anyang-si (KR); Yong Ho Kim, Anyang-si (KR)

(73) Assignee: LG ELECTRONICS INC., Seoul (KR)

(21) Appl. No.: 14/593,936

(22) Filed: Jan. 9, 2015

Related U.S. Patent Documents

Reissue of:
(64) Patent No.: 8,547,926
Issued: Oct. 1, 2013
Appl. No.: 12/920,439
PCT Filed: Mar. 2, 2009
PCT No.: PCT/KR2009/001009
§ 371 (c)(1),
(2) Date: Nov. 9, 2010
PCT Pub. No.: WO2009/110714
PCT Pub. Date: Sep. 11, 2009

U.S. Applications:
(63) Continuation of application No. 14/481,651, filed on Sep. 9, 2014, now Pat. No. Re. 45,996, which is an application for the reissue of Pat. No. 8,547,926.
(Continued)

(51) Int. Cl.
*H04W 4/00* (2018.01)
*H04W 48/12* (2009.01)
*H04W 48/08* (2009.01)

(52) U.S. Cl.
CPC ..... *H04W 48/12* (2013.01); *H04W 48/08* (2013.01)

(58) Field of Classification Search
CPC . H04L 27/3488; H04L 1/0041; H04L 1/0064; H04L 1/0054; H04L 1/0059;
(Continued)

(56) References Cited

U.S. PATENT DOCUMENTS

2004/0151109 A1* 8/2004 Batra ..... H04B 1/7163 370/208
2005/0201269 A1* 9/2005 Shim et al. ..... 370/208
(Continued)

FOREIGN PATENT DOCUMENTS

WO WO 2007/024110 A1 3/2007

OTHER PUBLICATIONS

IEEE Std. 802. 16e-2005 and IEEE Std. 16-2004/Cor1-2005 (Amendment and Corrigendum to IEEE Std 802. 16/2004); "IEEE Standard for Local and metropolitan area networks, Part 16: Air Interface for Fixed and Mobile Broadband Wireless Access . . . " Feb. 26, 2006.
(Continued)

*Primary Examiner* — Colin M LaRose
(74) *Attorney, Agent, or Firm* — Birch, Stewart, Kolasch & Birch, LLP

(57) ABSTRACT

A method for configuring system information, a method for transmitting system information, and a method for transmitting resource ratio information are disclosed. A method for receiving system information elements includes receiving a first message including a fixed-size system information element from a base station, and receiving a second message including an variable-size system information element from the base station.

2 Claims, 7 Drawing Sheets

Related U.S. Application Data

(60) Provisional application No. 61/033,011, filed on Mar. 2, 2008.

(58) Field of Classification Search
CPC ..... H04L 1/007; H04L 1/005; H04L 1/0071; H04L 2001/0098; H04N 21/2383; H04N 21/4382; H03M 13/6538; H03M 13/356; H03M 13/2732; H03M 13/1515; H04M 13/256; H04M 13/2957
See application file for complete search history.

(56) References Cited

U.S. PATENT DOCUMENTS

| | | | | |
|---|---|---|---|---|
| 2006/0153112 | A1* | 7/2006 | Lim et al. | 370/310 |
| 2007/0053383 | A1 | 3/2007 | Choi et al. | |
| 2007/0086370 | A1* | 4/2007 | Jang et al. | 370/318 |
| 2007/0086416 | A1* | 4/2007 | Jang et al. | 370/347 |
| 2008/0095195 | A1 | 4/2008 | Ahmadi et al. | |
| 2008/0205331 | A1 | 8/2008 | Jeong et al. | |
| 2009/0052387 | A1* | 2/2009 | Lee et al. | 370/329 |
| 2009/0161591 | A1 | 6/2009 | Ahmadi et al. | |
| 2009/0228891 | A1* | 9/2009 | Tao et al. | 718/104 |
| 2011/0188432 | A1* | 8/2011 | Yin | 370/311 |

OTHER PUBLICATIONS

IEEE Std 802. 16e-2005 and IEEE Std. 16/2004/Cor1-2005 (Amendment and Corrigendum to IEEE Std.802. 16-2004); "IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1," Feb. 28, 2006.

* cited by examiner (a)

(b)

METHOD FOR TRANSMITTING AND RECEIVING SYSTEM INFORMATION ELEMENTS IN A WIRELESS ACCESS SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This [application] *Application is a Reissue Continuation of U.S. Reissue patent application Ser. No. 14/481,651 filed on Sep. 9, 2014 (now U.S. Pat. No. RE45,996 issued on May 3, 2016), which is a Reissue of U.S. Pat. No. 8,547,926 issued on Oct. 1, 2013, which* is the National Phase of PCT/KR2009/001009 filed on Mar. 2, 2009 which claims priority under 35 U.S.C 119(e) of U.S. Provisional Application No. 61/033,011 filed on Mar. 2, 2008. The entire contents of the above applications are hereby incorporated by reference into the present application. *Notice: More than one reissue application has been filed for the reissue of U.S. Pat. No. 8,547,926: U.S. patent application Ser. No. 14/593,936 (present application) and U.S. patent application Ser. No. 14/481,651.*

BACKGROUND OF THE INVENTION

1. Field of the Invention

The present invention relates to a wireless access system, and more particularly, to a method for configuring system information and a method for transmitting system information, when a subframe structure is used. The present invention also relates to a method for notifying resource ratio information, when a subframe structure is used.

2. Discussion of the Related Art

A typical frame structure used in a wireless access system will be described below.

FIG. 1 illustrates a frame structure in a broadband wireless access system (e.g. Institute of Electrical and Electronics Engineers (IEEE) 802.16).

Referring to FIG. 1, the horizontal axis represents Orthogonal Frequency Division Multiple Access (OFDMA) symbols as time units and the vertical axis represents the logical numbers of subcarriers as frequency units, in a frame. One frame is divided into data sequence channels each having a predetermined duration according to the physical characteristics of the data sequence channels. Specifically, a frame is divided into a DownLink (DL) subframe and an UpLink (UL) subframe. A Transmit/receive Transition Gap (TTG) is interposed between a DL subframe and a UL subframe and a Receive/transmit Transition Gap (RTG) is interposed between frames.

A DL subframe may carry a preamble, a Frame Control Header (FCH), a DL-MAP, a UL-MAP, and one or more DL data bursts. A UL subframe may carry one or more UL data bursts and a ranging subchannel.

The preamble is a predetermined data sequence residing in the first symbol of each frame, for use in a Mobile Station's (MS's) acquisition of synchronization with a Base Station (BS) and channel estimation. The FCH provides information about channel allocation and channel coding of the DL-MAP. The DL-MAP and the UL-MAP are Media Access Control (MAC) messages carrying channel resource assignments to MSs. The DL data bursts and the UL data bursts are data units that the BS transmits to MSs or MSs transmit to the BS, respectively.

A Downlink Channel Descriptor (DCD) that can be transmitted in the frame structure illustrated in FIG. is a MAC message describing the physical characteristics of a downlink channel and an Uplink Channel Descriptor (UCD) is a MAC message describing the physical characteristics of an uplink channel.

On a downlink, an MS may detect a preamble transmitted from a BS and then decode a DL-MAP using information acquired from an FCH. The BS may transmit scheduling information to MSs in every frame (e.g. every 5 ms) by a DL-MAP or UL-MAP message to allocate downlink or uplink resources to the MSs.

[Table 1] below illustrates an exemplary format of the DL-MAP message.

TABLE 1

| Syntax | Size in bits | Description |
|---|---|---|
| DLMAP_Message_Format( ){ | — | — |
| Management Message Type = 2 | 8 | — |
| PHY Synchannel Field | Variable | see appropriate PHY sepcification. |
| DCD Count | 8 | — |
| Base station ID | 48 | — |
| Begin PHY-specific section{ | — | see applicable PHY subclause |
| if(Wireless MAN-OFDMA){ | — | — |
| No.OFDMA symbols | 8 | Number of OFDMA symbols in the DL subframe including all AAS/permutation zone and including the preamble |
| } | } | } |
| for(i=1; i<=n; i++){ | — | For each UL-MAP element 1 to n. |
| DL-MAP_IE( ) | variable | See corresponding PHY specification |
| } | — | — |
| } | — | — |
| if!(byte boundary){ | — | — |
| Padding Nibble | 4 | Padding to reach byte boundary |
| } | — | — |
| } | — | — |

Referring to [Table 1], Management Message Type is 2, identifying a DL-MAP message. A DCD provides downlink channel information (e.g. downlink burst profiles). DCD Count field specifies a value of the Configuration Change Count of the DCD. Hence, DCD Count field may indicate whether the DCD has been changed. No. OFDMA symbols filed specifies the number of OFDMA symbols allocated to a DL subframe. The DL-MAP message may include a variety of DL-MAP Information Elements (IEs) (i.e. DL-MAP_IE( ).

[Table 2] below illustrates an exemplary format of the UL-MAP message.

TABLE 2

| Syntax | Size in bits | Description |
|---|---|---|
| UL-MAP_Message_Format( ){ | — | — |
| Management Message Type | 8 | — |

TABLE 2-continued

| Syntax | Size in bits | Description |
|---|---|---|
| = 3 | | |
| Reserved | 8 | Shall be set to zero |
| UCD Count | 8 | — |
| Allocation Start Time | 32 | — |
| Begin PHY-specific section{ | — | see applicable PHY sub-clause |
| if(Wireless MAN-OFDMA){ | — | — |
| No.OFDMA symbols | 8 | Number of OFDMA symbols in the UL sub-frame |
| } | — | — |
| for(i=1; i<=n; i++){ | — | For each UL-MAP element 1 to n. |
| UL-MAP_IE( ) | variable | See corresponding PHY specification |
| } | — | — |
| } | — | — |
| if!(byte boundray){ | — | — |
| Padding Nibble | 4 | Padding to reach byte boundary |
| } | — | — |
| } | — | — |

Referring to [Table 2], Management Message Type is 3, identifying a UL-MAP message. A UCD provides uplink channel information (e.g. uplink burst profiles). UCD Count field specifies a value of the Configuration Change Count of the UCD. Hence, UCD Count field may indicate whether the UCD has been changed. Allocation Start Time specifies an effective start time of uplink allocation defined by the UL-MAP message, in PHY-specific units. No. OFDMA symbols field specifies the number of OFDMA symbols allocated to a UL subframe.

In a Wireless Metropolitan Area Network-Orthogonal Frequency Division Multiple Access (WMAN-OFDMA) system, a BS may transmit most of system IEs (or system configuration information) to MSs periodically (e.g. every 0.5 to 2 seconds or every up to 10 seconds) via a DCD/UCD message. In addition, the BS may transmit certain system configuration information, such as a frame number, a frame duration, a BS Identifier (ID), the number of symbols, to the MSs via a MAP message.

In general, system IEs are transmitted with a long period and an MS needs to acquire the system IEs in order to enter a network. Thus, the network entry of the MS may take a long time. In addition, since system information carried in a DL-MAP does not change often, it is not necessary to transmit the system information in every frame.

System information delivered by a DCD/UCD takes the form of Type, Length, and Value (TLV). Accordingly, additional information such as Type and Length is required for a specific system IE, thus consuming resources. The length of a message is actually determined based on TLV encoding information of system IEs included in the message. Therefore, the BS should notify an MS of the size of resources occupied by the message all the time.

A system IE may be transmitted at a fixed size. Because the system IE includes information of a fixed size, the BS does not need to transmit resource allocation information about the Type and Length fields of the system IE to MSs. If all system IEs are used at fixed sizes, the scalability of the system IEs may be decreased. Moreover, all system information delivery messages are transmitted at fixed sizes every fixed period and thus more radio resources are used to transmit system information.

If the BS transmits a system information delivery message including system IEs of fixed sizes every predetermined period, which is longer than a superframe period (e.g. a multiple of the superframe period, such as 40 ms, 80 ms, etc.), less resources may be used than when system information is transmitted every superframe period. However, the problems of decreased scalability and delayed initial network entry of MSs still exist.

One system IE used in a WMAN-OFDMA Time Division Duplexing (TDD) system (e.g. IEEE 802.16d/e/Rev2) is a DL/UL ratio field indicating the ratio between DL subframes and UL subframes (or No. OFDMA symbols).

The DL/UL ratio field may be included in the DL-MAP and UL-MAP messages. Once a DL/UL ratio is set, the system does not change the DL/UL ratio often. Especially if information about the configuration and/or length (e.g. the number of Orthogonal Frequency Division Multiplexing (OFDM) symbols) of a subframe can be acquired from system information in a system using superframe and subframe structures, it is a waste of radio resources to transmit DL/UL ratio information on a symbol basis.

SUMMARY OF THE INVENTION

Accordingly, the present invention is directed to a method for transmitting system information that substantially obviates one or more problems due to limitations and disadvantages of the related art.

An object of the present invention is to provide a method for transmitting system IEs efficiently.

Another object of the present invention is to provide a configuration of system IEs and a structure of a system information delivery message to transmit system IEs.

Another object of the present invention is to provide a method for efficiently transmitting fixed system IEs or variable system IEs.

A further object of the present invention is to provide a method for transmitting a DL/UL ratio field and a structure of the DL/UL ratio field.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for receiving system information elements includes receiving a first message including a fixed-size system information element from a base station, and receiving a second message including an variable-size system information element from the base station.

The first message may further include configuration information about the variable-size system information element.

The first message may be a primary superframe header and the second message may be a secondary superframe header. The first message may be transmitted in every superframe and the second message may be transmitted every predetermined number of superframes.

The first message may be a superframe header and the second message may be one of a subframe header, a downlink channel descriptor message, and an uplink channel descriptor message. If the fixed-size system information element is changed, the second message may include a changed fixed-size system information element.

The first message may further include downlink to uplink ratio (DL/UL ratio) information.

In another aspect of the present invention, a method for transmitting system information elements includes transmitting a first message including a fixed-size system information element to a mobile station, and transmitting a second message including a variable-size system information element to the mobile station.

The first message may further include configuration information about the variable-size system information element. The first message may be a primary superframe header and the second message may be a secondary superframe header. The first message may be transmitted in every superframe and the second message may be transmitted every predetermined number of superframes.

The first message may be a superframe header and the second message may be one of a subframe header, a downlink channel descriptor message, and an uplink channel descriptor message. If the fixed-size system information element is changed, the second message may include a changed fixed-size system information element.

The first message may further include downlink to uplink ratio (DL/UL ratio) information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
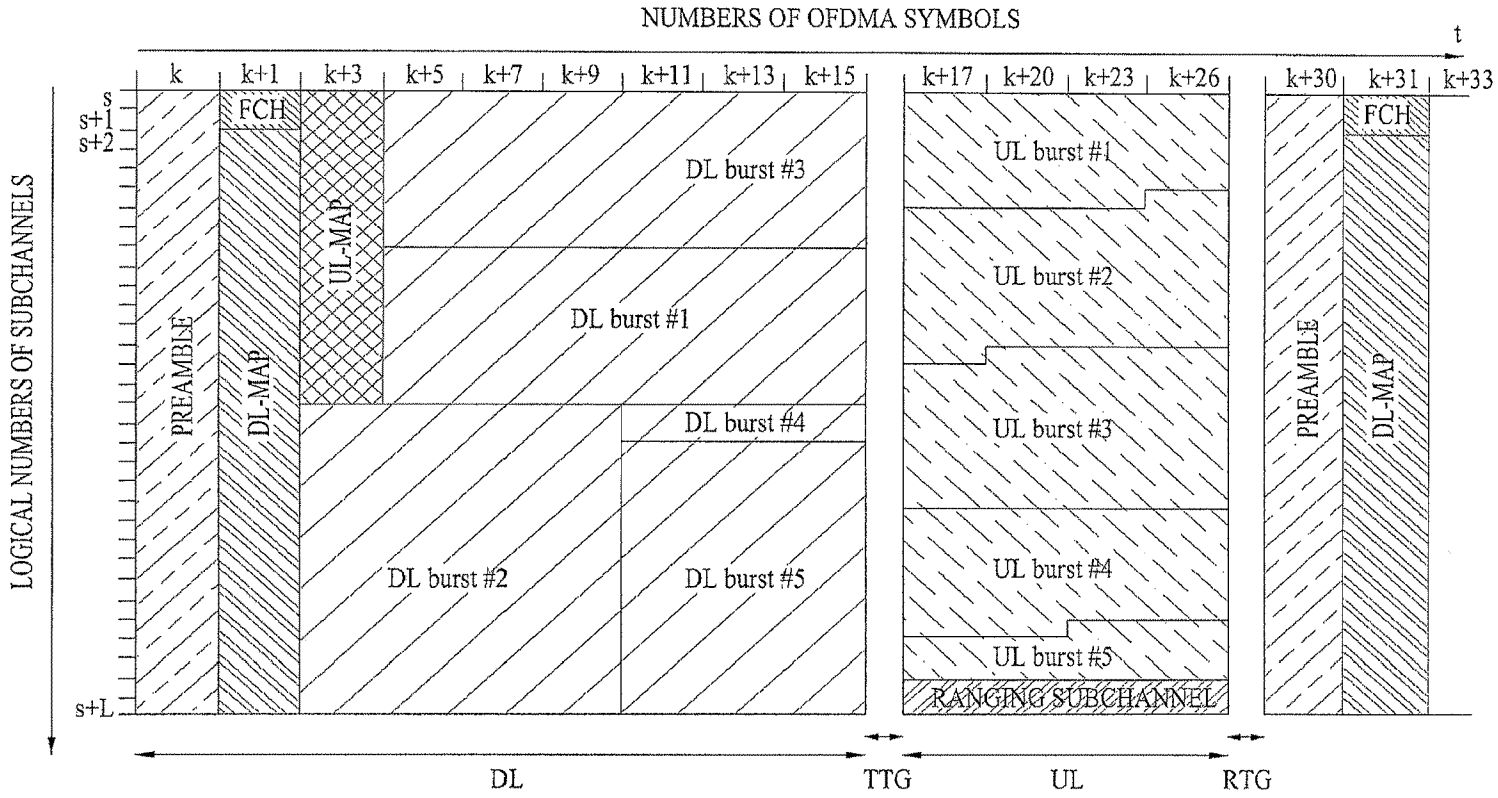
FIG. 1 illustrates a frame structure in a broadband wireless access system (e.g. Institute of Electrical and Electronics Engineers (IEEE) 802.16).

The present invention relates to a wireless access system. Exemplary embodiments of the present invention provide various methods for configuring system information and various methods for transmitting system information. In addition, the exemplary embodiments of the present invention provide various methods for transmitting resource ratio information (e.g. a DownLink/UpLink (DL/UL) ratio field).

The exemplary embodiments of the present invention described hereinbelow are combinations of elements and features of the present invention. The elements or features may be considered selective unless otherwise mentioned. Each element or feature may be practiced without being combined with other elements or features. Further, an exemplary embodiment of the present invention may be constructed by combining parts of the elements and/or features. Operation orders described in embodiments of the present invention may be rearranged. Some constructions of any one embodiment may be included in another embodiment and may be replaced with corresponding constructions of another exemplary embodiment.

In the description of drawings, procedures or steps, which may distract from the substance of the present invention, are not explained. In addition, procedures or steps, which can be understood by those skilled in the art, are not explained as well.

In the exemplary embodiments of the present invention, a description is made of a data transmission and reception relationship between a Base Station (BS) and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', etc. The term used herein 'MS' may be replaced with the term 'User Equipment (UE)', 'Subscriber Station (SS)', 'Mobile Subscriber Station (MSS)', 'terminal', 'mobile terminal', etc.

A transmitter means a fixed and/or mobile node that transmits voice or data service and a receiver means a fixed and/or mobile node that receives voice or data service.

Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

Smart phones combine the functions of both mobile phones and PDAs, such as, scheduling and data communications such as fax transmission and reception and Internet connection. The MB-MM terminal refers to a terminal which has a multi-modem chip therein and which can operate in any of a mobile Internet system and other mobile communication systems (e.g. CDMA 2000, WCDMA, etc.)

Exemplary embodiments of the present invention may be achieved by various means, for example, hardware, firmware, software, or a combination thereof.

In a hardware configuration, the methods according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing functions or operations as set forth herein. Software code may be stored in a memory unit and executed by a processor. The memory unit is located at the interior or exterior of the processor and may transmit and receive data to and from the processor via various known means.

The exemplary embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the exemplary embodiments of the present invention may be supported by the above documents. All terms used in the exemplary embodiments of the present invention may be explained by the standard documents. Especially the exemplary embodiments of the present invention may be supported by at least one of P802.16e-2004, P802.16e-2005, and P802.16Rev2 documents which are the standards of IEEE 802.16.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used for the embodiments of the present invention are provided to help the understanding of the present invention. These specific terms may be replaced with other terms within the scope and spirit of the present invention.

For example, a system information delivery message may also be referred to as a SuperFrame Header (SFH), a broadcast channel (BCH) or an additional system information message.

Figure 2:
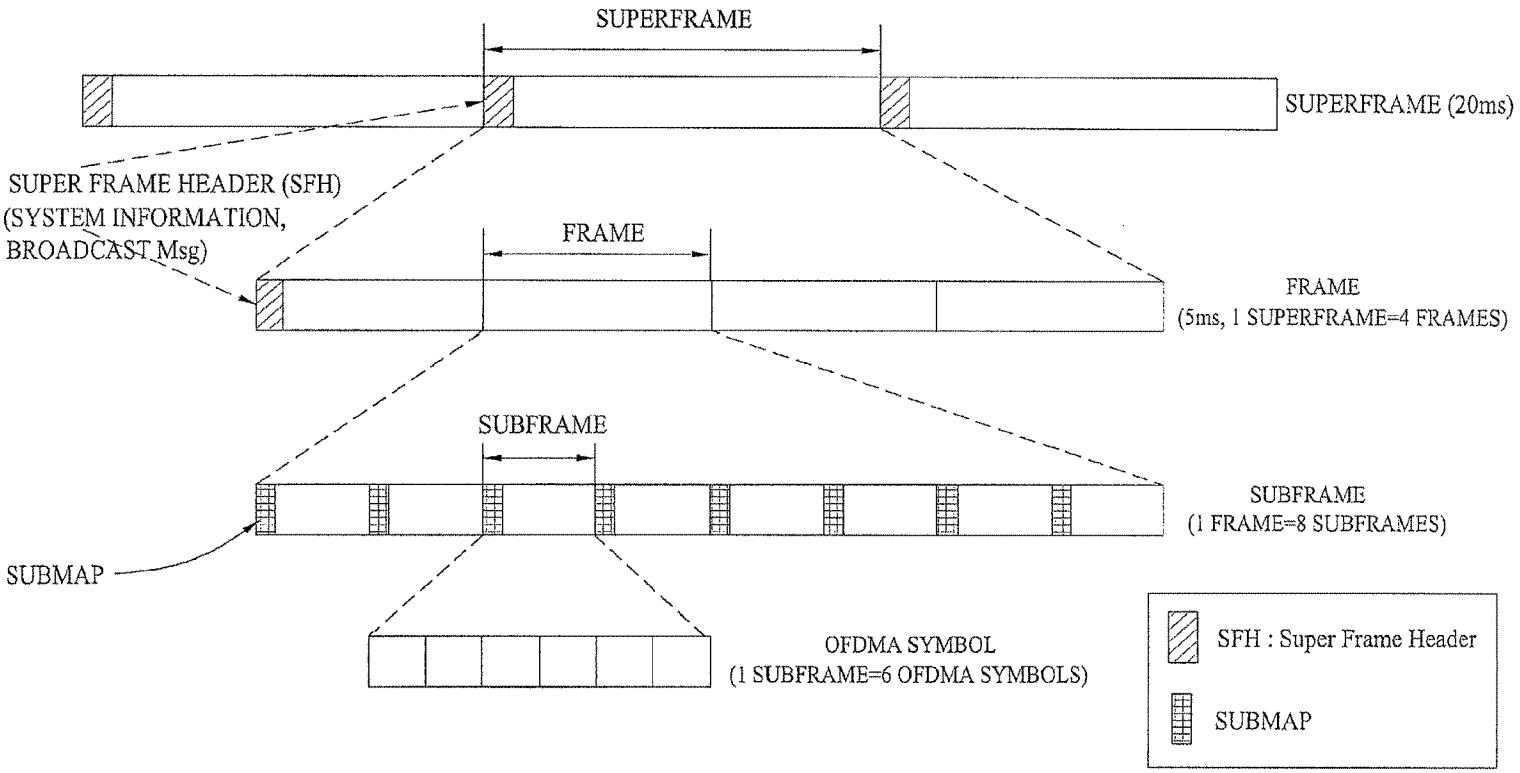
FIG. 2 illustrates a new frame structure used in exemplary embodiments of the present invention.

FIG. 2 illustrates a new frame structure used in exemplary embodiments of the present invention.

Referring to FIG. 2, one superframe may include one or more frames and each frame may include one or more subframes. Each subframe may include one or more Orthogonal Frequency Division Multiple Access (OFDMA) symbols.

The lengths and numbers of superframes, frames, subframes and symbols may be adjusted according to a user request or a system environment. Herein, the term 'subframe' refers to any lower-layer frame structure produced by dividing one frame by a predetermined length.

In FIG. 2, it is assumed that a superframe is 20 ms long and a frame is 5 ms long. Each frame may include 8 subframes, each subframe having 6 OFDMA symbols. The specific values may vary depending on channel environments.

An SFH may reside at the start of each superframe (i.e. first, second and third OFDMA symbols of the superframe) in order to deliver physical (or logical) channel information (or system information) of the system such as frame configuration information. The SFH may be referred to as a Super MAP, a broadcast channel (BCH) (or broadcast control channel (BCCH)), a common control channel (CCCH) or a superframe-MAP. Hereinafter, the term 'SFH' is used in the exemplary embodiments of the present invention.

A subframe MAP may be allocated to the start of a subframe. The subframe MAP may also be referred to as a Sub-MAP or Advanced-MAP (A-MAP). The Sub-MAP may include a DL-Sub-MAP and a UL-Sub-MAP.

Figure 3:
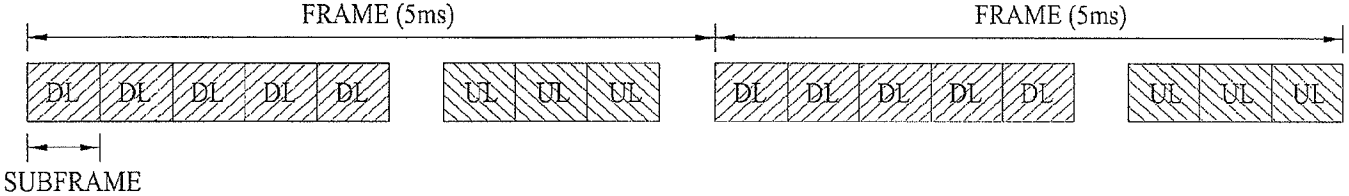
FIG. 3 illustrates a configuration of downlink subframes and uplink subframes used in exemplary embodiments of the present invention.

FIG. 3 illustrates a configuration of downlink subframes and uplink subframes used in exemplary embodiments of the present invention.

Referring to FIG. 3, different numbers of DL subframes and UL subframes form a Time Division Duplexing (TDD) frame. The DL:UL ratio is 5:3 herein. This means that if one frame includes 8 subframes, 5 subframes out of the 8 subframes are DL subframes and the other 3 subframes are UL subframes.

<Method for Configuring System Information Delivery Message>

In accordance with an exemplary embodiment of the present invention, a system information delivery message may be divided into a fixed-size part and a variable-size part to transmit system information efficiently. The system information delivery message may be an SFH in exemplary embodiments of the present invention. The fixed-size part and variable-size part of the system information delivery message may be referred to as a primary SFH and a secondary SFH, respectively.

The primary SFH may be transmitted at a fixed MCS level with a fixed configuration every SFH period. Because system IEs have fixed sizes in the primary SFH, the system IEs are preferably limited in size. That is, the system IEs included in the primary SFH always have fixed sizes and thus need not be represented in the form of Type, Length, Value (TLV).

The configuration of the secondary SFH may be considered in two ways. For example, the secondary SFH may be designed so as to include system IEs of one type. The type of system IEs included in the secondary SFH may vary from one wireless communication system to another. The system IEs included in the secondary SFH may be defined by each wireless communication system.

In addition, the secondary SFH may be designed such that system IEs of one or more types are available to the secondary SFH and different system IEs may be included in the secondary SFH according to the types of system IEs. According to the type of system IEs included in the secondary SFH, the secondary SFH may be transmitted with a different transmission period. In this case, preset system IEs may be included in the secondary SFH all the time according to the type of system IEs. Therefore, each message need not be represented in the form of TLV.

Criteria to distinguish between system IEs for a primary SFH and system IEs for a secondary primary SFH in a system information delivery message (e.g. an SFH) according to exemplary embodiments of the present invention will be described below.

According to one criterion, frame configuration information, frame control information, and primary IEs required for initial network entry of MSs may be included in the primary SFH.

The frame control information may include a Frame Number field, a Receive/transmit Transition Gap (RTG), a Transmit/receive Transition Gap (TTG), the number of symbols of a DL subframe, a UL allocation start time, a BS Identifier (ID), etc.

The primary IEs may include a ranging code (e.g. an initial ranging code, a periodic ranging code, a handover ranging code and/or a bandwidth request ranging code), backoff start/end values, a ranging region according to the ranging code, an initial value of the ranging code, a permutation base, UL initial transmit timing information, etc. System IEs other than the system IEs included in the primary SFH, such as handover information, may be included in the secondary SFH.

The other criterion is that among the frame configuration information and the primary IEs required for network entry, system IEs that are rarely changed are included in the primary SFH and system IEs that are highly likely to change are included in the secondary SFH.

Figure 4:
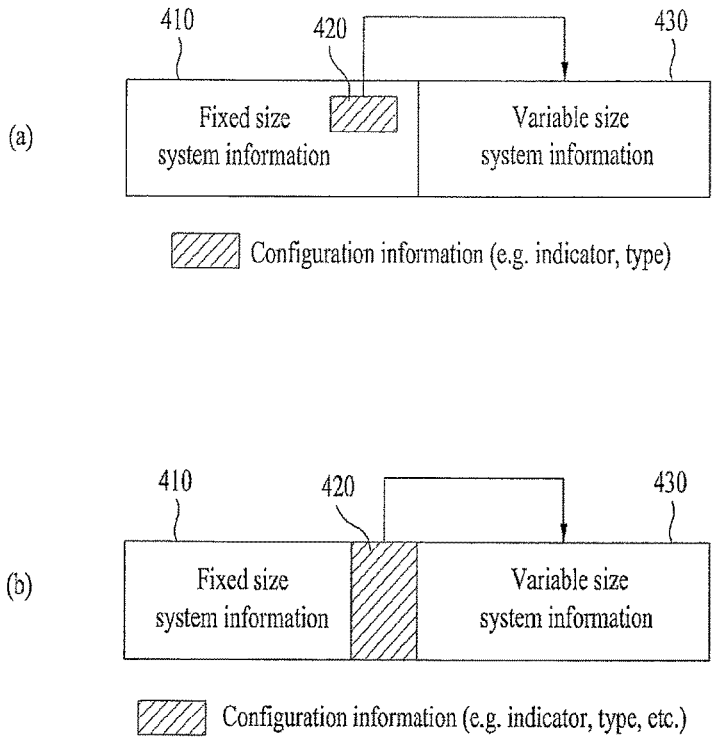
FIG. 4 illustrates configurations of system information according to exemplary embodiments of the present invention.

FIG. 4 illustrates configurations of system information according to exemplary embodiments of the present invention.

Referring to FIG. 4(a), system IEs may be configured with fixed-size system information (or fixed system information) 410 and variable-size system information (or variable system information) 430. In the exemplary embodiments of the present invention, the fixed-size system information 410 may be referred to as a primary SFH and the variable-size system information 430 may be referred to as a secondary SFH.

The primary SFH 410 may include Configuration Information (CI) 420 that provides physical (or logical) information about the secondary SFH 430. The CI 420 may include an indicator indicating whether the secondary SFH 430 is included, an Information Type field indicating the type of system IEs included in the secondary SFH 430, and a Version field indicating the version of the system IEs included in the secondary SFH 430. The CI 420 may further include a Resource Allocation field and a Resource Block Size field, which specify a region to which the secondary SFH 430 is allocated.

Referring to FIG. 4(b), system information may include the fixed-size system information (i.e. the primary SFH) 410, the CI 420, and the variable-size system information (i.e. the secondary SFH) 430. The system information configuration illustrated in FIG. 4(b) differs from that illustrated in FIG. 4(a) in that the CI 420 is transmitted separately from the primary SFH 410. The CI 420 may carry the same configuration information about the secondary SFH 430 as described above with reference to FIG. 4(a).

Figure 5:
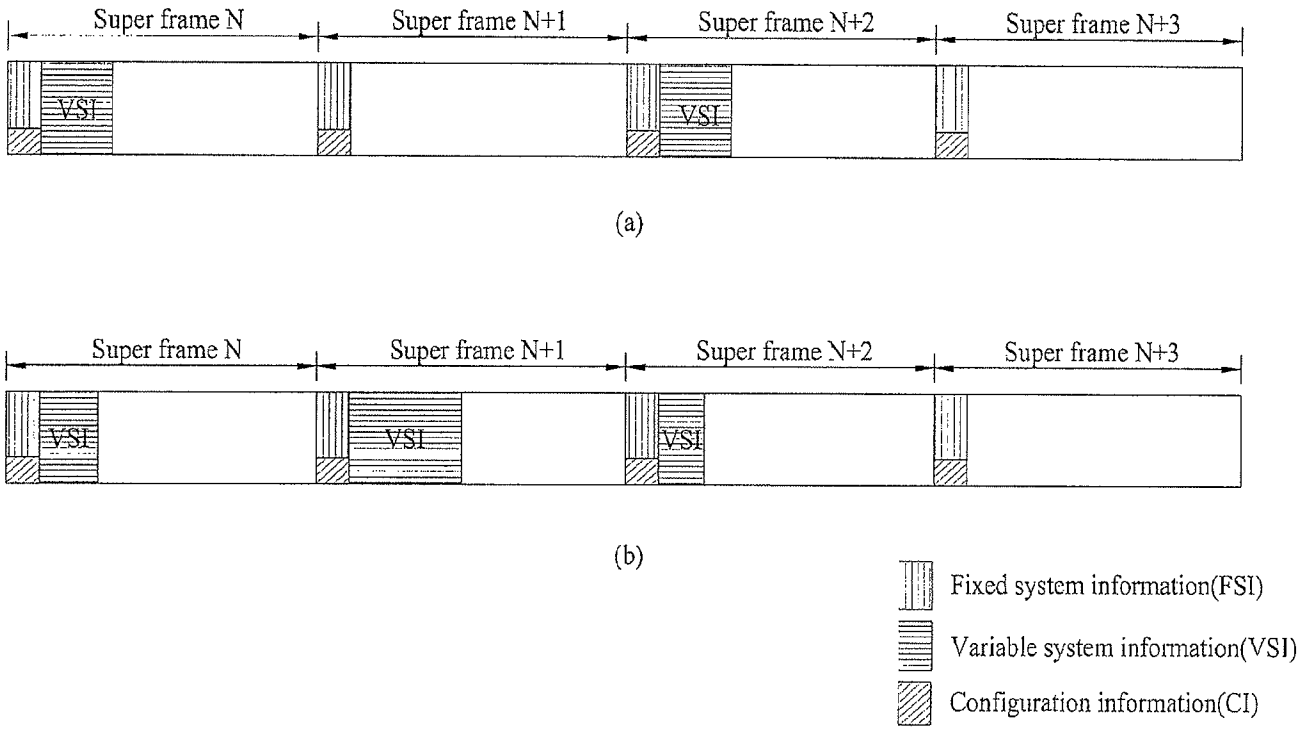
FIG. 5 illustrates transmission of a system information delivery message according to an exemplary embodiment of the present invention.

FIG. 5 illustrates transmission of a system information delivery message according to an exemplary embodiment of the present invention.

Referring to FIG. 5(a), a primary SFH may be transmitted at the start of each superframe. While the primary SFH may be transmitted in every superframe, a secondary SFH may be transmitted in every other superframe. CI may be included in the primary SFH and the CI may include information about the secondary SFH, such as an information element indicator and an Information Type field.

Variable system IEs included in the secondary SFH may be of one type. In this case, the CI may be transmitted in the primary SFH in every superframe. The information element indicator included in the CI may indicate whether the secondary SFH is included in the superframe.

FIG. 5(b) illustrates a system information delivery message in which variable system IEs of one or more types are included in the secondary SFH. In this case, the size of the secondary SFH may be changed in every superframe. For example, the Information Type field of the CI may indicate a first type in an $N^{th}$ superframe, a second type in an $(N+1)^{th}$ superframe, and a third type in an $(N+2)^{th}$ superframe. That is, the size of the secondary SFH may be changed according to the type of system IEs included in the secondary SFH in every superframe. In the illustrated case of FIG. 5(b), the indicator included in the CI in an $(N+3)^{th}$ superframe indicates that the secondary SFH is not included in the $(N+3)^{th}$ superframe.

<Method for Transmitting DL/UL Ratio Information>

In a communication system, DL/UL ratio information does not change often. Hence, there is no need to transmit DL/UL ratio information in every frame. Especially when an MS determines the configuration and/or lengths of subframes (for example, the length of a subframe is expressed as the number of OFDM symbols in the subframe) from system IEs in a system using superframe and subframe structures, transmission of DL/UL ratio information on a symbol basis from a BS may lead to waste of radio resources.

In accordance with another exemplary embodiment of the present invention, the BS may transmit DL/UL ratio information to the MS on a subframe basis. Referring to FIG. 3, one frame may include 8 subframes. The BS may transmit DL/UL ratio information in the form of a bitmap or an index based on a DL/UL pattern to the MS.

[Table 3] below illustrates an exemplary format of DL/UL ratio information taking the form of an 8-bit bitmap.

TABLE 3

| Name | Size | Note |
|---|---|---|
| DL/UL ratio | 8 | DL/UL ratio and DL/UL switching point in a frame. Each bit is mapped to one subframe and indicates whether the corresponding subframe is for downlink or uplink.<br>If a bit for a subframe is 0, the subframe is for downlink traffic. Otherwise, the subframe is for uplink. |

Referring to [Table 3], if DL/UL ratio information is configured in the form of an 8-bit bitmap, each bit of the bitmap may be mapped to a subframe. For instance, Bit #7 (Most Significant Bit (MBS)) represents the first subframe, Bit #6 represents the second subframe, and Bit #5 represents the third subframe. In the same manner, Bit #0 (Least Significant Bit (LSB)) represents the last subframe, that is, the eighth subframe.

In [Table 3], each bit of the bitmap may indicate whether a subframe mapped to the bit is a downlink subframe or an uplink subframe. For example, if the bit is set to '0', this indicates a downlink subframe and if the bit is set to '1', this indicates an uplink subframe. In this manner, the DL/UL ratio information may implicitly indicate the positions and number of DL/UL switching points.

[Table 4] below illustrates an exemplary format of DL/UL ratio information taking the form of an index.

TABLE 4

| Name | Size | Note |
|---|---|---|
| DL/UL ratio | 3 | Each value indicates a DL/UL ratio defined by the system.<br>0b000: (DL):(UL) = 5:3<br>0b001: (DL):(UL) = 6:2<br>0b010: (DL):(UL) = 4:4<br>0b011: (DL):(UL) = 2:2:2:2<br>0b100: (DL):(UL) = 3:5<br>0b101~0b111: reserved |

In the exemplary embodiments of the present invention, DL/UL ratio information may be configured based on DL/UL ratios preset by the system. The DL/UL ratios may vary depending on a communication environment or a user request. Referring to [Table 4], 0b000 indicates a DL/UL ratio of 5:3, 0b001 indicates a DL/UL ratio of 6:2, 0b010 indicates a DL/UL ratio of 4:4, 0b100 indicates a DL/UL ratio of 3:5, and the other values are reserved for other DL/UL ratios.

In accordance with another exemplary embodiment, the BS may notify the MS of a frame structure using DL/UL ratios described above with reference to [Table 3] and [Table 4]. Once DL/UL ratio information is set, it cannot be changed easily. For example, therefore, the BS may transmit the DL/UL ratio information to the MS by a primary SFH described in FIG. 4. If a DL/UL ratio is changed for a frame, the BS may transmit a Sub-MAP (or A-MAP) including the changed DL/UL ratio information to the MS. In this manner, the BS can indicate a changed DL/UL ratio to the MS.

Figure 6:
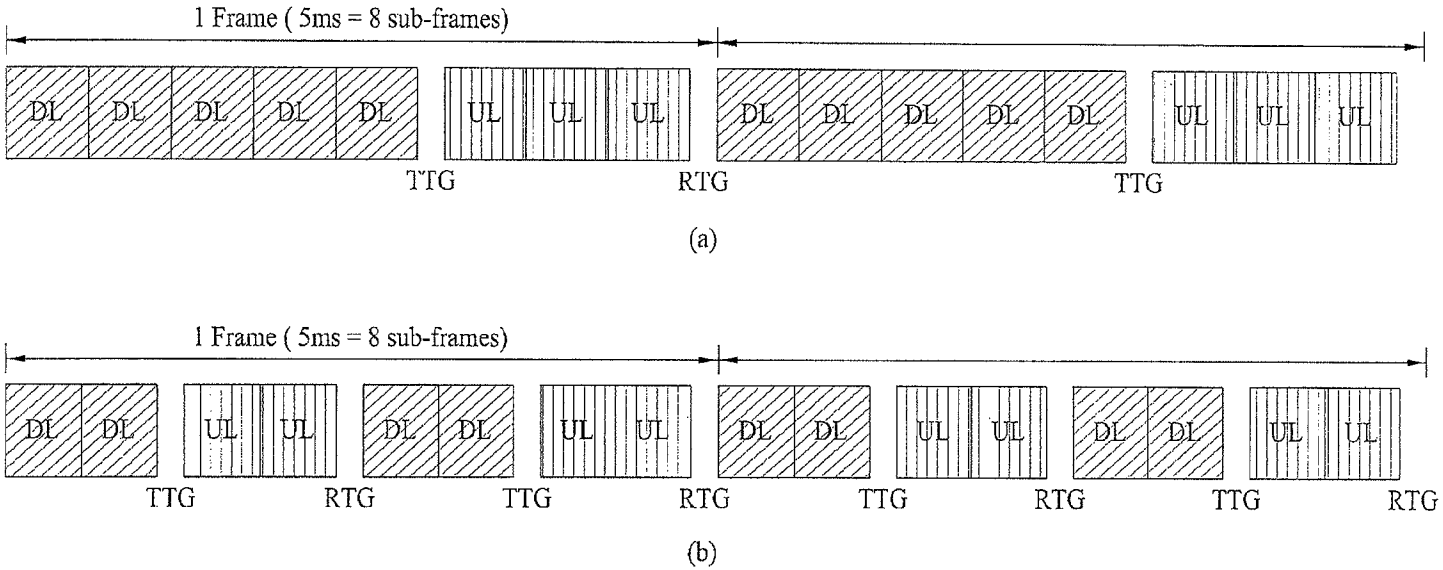
FIG. 6 illustrates frame structures based on resource allocation information according to exemplary embodiments of the present invention.

FIG. 6 illustrates frame structures based on resource allocation information according to exemplary embodiments of the present invention.

FIG. 6(a) illustrates a frame structure having a DL/UL ratio of 5:3 for a frame. The BS may transmit DL/UL ratio information (e.g. 0b00000111) using a bitmap having the configuration of [Table 3] to the MS, or transmit DL/UL ratio information (e.g. 0b000) using an index illustrated in [Table 4] to the MS.

Referring to FIG. 6(a), a DL/UL switching point is a transition between a bit value 0 to a bit value 1 or vice versa. In the illustrated case of FIG. 6(a), a frame has two DL/UL switching points (i.e. a TTG and an RTG), between the fifth and sixth subframes of the frame and between the last subframe of the frame and the first subframe of the next frame.

FIG. 6(b) illustrates a frame structure having a DL/UL ratio of 2:2:2:2 for a frame. The BS may transmit DL/UL ratio information (e.g. 0b00110011) using a bitmap having the configuration of [Table 3] to the MS, or transmit DL/UL ratio information (e.g. 0b011) using an index illustrated in [Table 4] to the MS.

In FIG. 6(b), four DL/UL switching points (TTGs and RTGs) are defined in a frame. Specifically, TTGs are interposed between the second and third subframes of the frame and between the sixth and seventh subframes of the frame, and RTGs are interposed between the fourth and fifth subframes of the frame and between the last subframe of the frame and the first subframe of the next frame.

Figure 7:
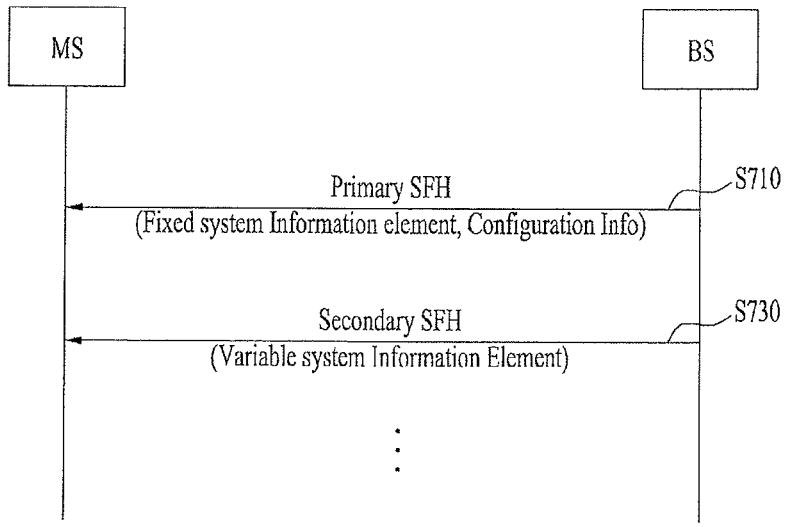
FIG. 7 illustrates signal flows for methods for transmitting system information according to exemplary embodiments of the present invention.
Figure 7:
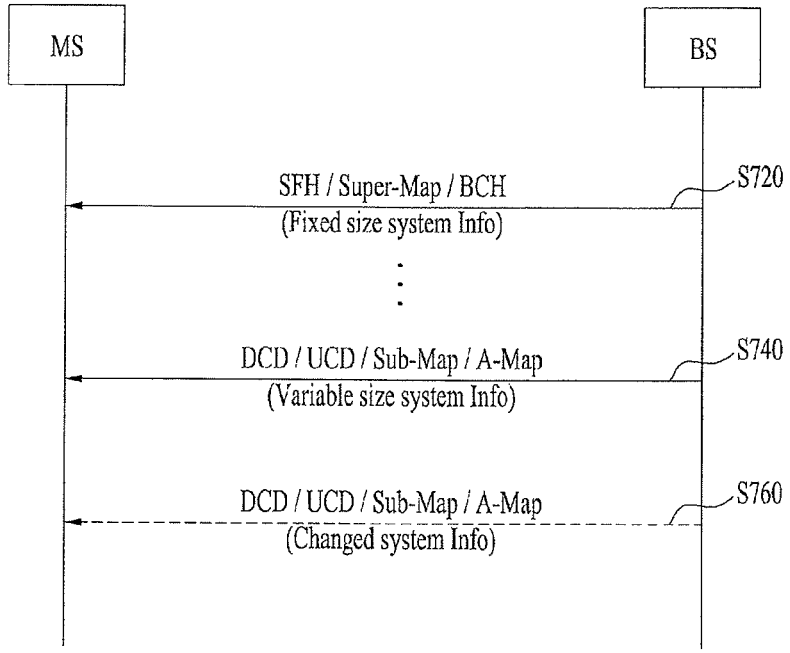

FIG. 7 illustrates signal flows for methods for transmitting system information according to exemplary embodiments of the present invention.

Referring to FIG. 7(a), the BS may transmit a primary SFH including fixed system IEs and CI to the MS. The fixed system IEs and CI have been described before with reference to FIG. 4. The fixed system IEs may include DL/UL ratio information described with reference to FIG. 6 (S710).

The CI provides configuration information about a secondary SFH. In another exemplary embodiment, the BS may transmit the CI to the MS using a separate message, as opposed to transmitting the CI in the primary SFH in step S710.

The BS may transmit a secondary SFH including variable system IEs to the MS (S730). The variable system IEs are IEs that may be changed in the system, except the fixed system IEs.

Referring to FIG. 7(b), the BS may transmit fixed system IEs to the MS by a system information delivery message such as an SFH, a Super MAP or a BCH. That is, the BS may transmit the fixed system IEs using an SFH that is transmitted in every superframe (every 20 ms). The fixed system IEs may include DL/UL ratio information described with reference to FIG. 6 (S720).

In addition, the BS may transmit variable system IEs to the MS by an additional system information delivery message such as a DCD message, a UCD message, a Sub-MAP, or an A-MAP (S740).

Depending on a communication environment or a user request, the fixed system IEs allocated in step S720 may have been changed. In this case, the BS may transmit the changed system IEs to the MS via a DCD message, a UCD message, a SubMAP, or an A-MAP (S760).

In FIG. 7(b), the BS may transmit the DL/UL ratio information to the MS via a DCD message or the like, not via an SFH. In this case, the DCD message is not transmitted every superframe period and thus it takes a long time for the MS to acquire the DL/UL ratio information. More specifically, when the DL/UL ratio information is transmitted in a primary SFH or an SFH, the MS may acquire the DL/UL ratio information faster than when the DL/UL ratio information is transmitted in a secondary SFH or a DCD/UCD message.

Now a description will be given of apparatuses of an MS and a BS that can implement the exemplary embodiments of the present invention illustrated in FIGS. 2 to 7 according to an exemplary embodiment of the present invention.

The MS may operate as a transmitter on an uplink and as a receiver on a downlink. The BS may operate as a receiver on the uplink and as a transmitter on the downlink. Therefore, the MS and the BS may each include a transmitter and a receiver to transmit and receive information or data.

The MS and the bS may each include a processor, a module, a part and/or means to implement the exemplary embodiments of the present invention. Especially the MS and the BS may each include a module (means) for encrypting a message, a module for decrypting an encrypted message, and an antenna for transmitting and receiving messages.

The MS according to the exemplary embodiments of the present invention may include a low-power Radio Frequency/Intermediate Frequency (RF/IF) module. In addition, the MS may include means, modules or parts for performing a control function, a MAC frame conversion control function based on service characteristics and a propagation environment, a handover function, an authentication and encryption function, a packet modulation and demodulation function for data transmission and reception, a high-speed packet channel coding function, and a real-time modem control function in order to implement the above-described exemplary embodiments of the present invention.

The BS may transmit data received from a higher layer to the MS in a wireless or wired fashion. The BS may include a low-power RF/IF module. In addition, the BS may include means, modules or parts for performing a control function, OFDMA packet scheduling, TDD packet scheduling and channel multiplexing, a MAC frame conversion control function based on service characteristics and a propagation environment, a handover function, an authentication and encryption function, a packet modulation and demodulation function for data transmission and reception, a high-speed packet channel coding function, and a real-time modem control function in order to implement the above-described exemplary embodiments of the present invention.

As is apparent from the above description of the exemplary embodiments of the present invention, system information can be efficiently transmitted.

Since a system information delivery message is divided into a primary SFH and a secondary SFH, the overhead of fixed-size system IEs can be reduced. The fixed-size system IEs do not include a Type field and a Length field, thereby reducing the overhead of the system information delivery message.

Radio resources can be conserved by transmitting a DL/UL ratio field from a BS. Furthermore, an MS can acquire DL/UL ratio information from the DL/UL ratio field in an SFH.

The exemplary embodiments of the present invention are applicable to various wireless access systems including a 3GPP system, a 3GPP2 system, and/or an IEEE 802.xx system. Besides these wireless access systems, the exemplary embodiments of the present invention are applicable to all technical fields to which wireless access systems are applied.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It will be obvious to those skilled in the art that claims that are not explicitly cited in each other in the appended claims may be presented in combination as an exemplary embodiment of the present invention or included as a new claim by a subsequent amendment after the application is filed.

What is claimed is:

[1. A method for receiving system information elements, in a wireless access system, the method comprising:

receiving, by a mobile station (MS), a super frame header (SFH) including a fixed-size system information element (IE) and configuration information (CI) related to a variable-size system information element (IE), wherein the CI includes an information type field indicating a type of the variable size system IE; and receiving, by the MS, an advanced-MAP (A-MAP) based on the CI, the A-MAP including the variable-size system information element (IE), wherein the SFH is transmitted at a start of each superframe and the A-MAP is transmitted at a start of a downlink (DL) subframe included in a frame which is one of four frames included in the superframe, the fixed-size system information element (IE) comprises at least one of a primary information element (IE) required for initial network entry of the MS, frame configuration information, frame control information, and downlink to uplink ratio (DL/UL ratio) information indicating a ratio of DL subframes and UL subframes which are included in each of the four frames, the variable-size system information element (IE) has one or more types, and information comprised in the variable-size system information element (IE) is variable according to the type indicated by the information type field, and the variable-size system information element (IE) further comprises changed DL/UL ratio information if the DL/UL ratio information is changed at the frame where the A-MAP is received.]

[2. The method according to claim 1, wherein the CI comprises an indicator indicating whether or not the A-MAP is present.]

[3. The method according to claim 1, wherein the frame control information comprises a frame number field, a receive/transmit transition gap (RTG) field, a transmit/receive transition gap (TTG) field, a number of symbols of a downlink subframe, an uplink allocation start time field, and a base station identifier field.]

[4. The method according to claim 1, wherein the primary IE comprises at least one of ranging code information, backoff start value information, backoff end value information, ranging region information according to the ranging code information, permutation base information, and uplink initial transmit timing information.]

[5. A method for transmitting system information elements in a wireless access system, the method comprising:

transmitting, by a base station (BS), a super frame header (SFH) including a fixed-size system information element (IE) and configuration information (CI) related to a variable-size system information element (IE), wherein the CI includes an information type field indicating a type of the variable size system IE; and transmitting, by the BS, an advanced-MAP (A-MAP) based on the CI, the A-MAP including the variable-size system information element (IE), wherein the SFH is transmitted at a start of each superframe and the A-MAP is transmitted at a start of a downlink (DL) subframe included in a frame which is one of four frames included in the superframe, wherein the fixed-size system information element (IE) comprises at least one of a primary information element (IE) required for initial network entry of the MS, frame configuration information, and frame control information, and downlink to uplink ratio (DL/UL ratio) information indicating a ratio of DL subframes and UL subframes which are included in each of the four frames, and wherein the variable-size system information element (IE) has one or more types, and information comprised in the variable-size system information element (IE) is variable according to the type indicated by the information type field, the variable-size system information element (IE) further comprises changed DL/UL ratio information if the DL/UL ratio information is changed at the frame where the A-MAP is received.]

[6. The method according to claim 5, wherein the CI comprises an indicator indicating whether or not the A-MAP is present.]

[7. The method according to claim 5, wherein the frame control information comprises a frame number field, a receive/transmit transition gap (RTG) field, a transmit/receive transition gap (TTG) field, a number of symbols of a downlink subframe, an uplink allocation start time field, and a base station identifier field.]

[8. The method according to claim 5, wherein the primary IE comprises at least one of ranging code information, backoff start value information, backoff end value information, ranging region information according to the ranging code information, permutation base information, and uplink initial transmit timing information.]

*9. A method of receiving a signal frame, the method comprising:*

*receiving, by a receiving unit, a plurality of Orthogonal Frequency Division Multiplexing (OFDM) symbols via an antenna; and*

*processing, by a processor, the received plurality of OFDM symbols,*

*wherein the plurality of OFDM symbols are carried by a set of frame units,*

*wherein at least one of the frame units includes a primary part, a secondary part, and one or more sub-frames carrying data,*

*wherein the primary part is followed by the secondary part,*

*wherein the primary part includes first system information of which size is fixed,*

*wherein the secondary part includes second system information of which size is variable, and*

*wherein the first system information includes information required to decode the secondary part, information to indicate a number of the sub-frames, and information to indicate a number of OFDM symbols in a sub-frame.*

*10. The method of claim 9, wherein the first system information further includes information on a size of the secondary part.*

* * * * *